(12) United States Patent
Gammon

(10) Patent No.: US 6,769,309 B1
(45) Date of Patent: Aug. 3, 2004

(54) NOZZLE TEST FIXTURE

(75) Inventor: James H. Gammon, Manasquan, NJ (US)

(73) Assignee: Gammon Technical Products, Inc., Manasquan, NJ (US)

( * ) Notice: Subject to any disclaimer, the term of this patent is extended or adjusted under 35 U.S.C. 154(b) by 0 days.

(21) Appl. No.: 10/339,208

(22) Filed: Jan. 9, 2003

(51) Int. Cl.[7] .................................................. G01M 5/00
(52) U.S. Cl. ........................................................ 73/802
(58) Field of Search .......................... 73/799, 802, 808, 73/855, 856, 857

(56) References Cited

U.S. PATENT DOCUMENTS

| | | | |
|---|---|---|---|
| 3,778,092 A | | 12/1973 | Magorien |
| 4,567,924 A | | 2/1986 | Brown |
| 5,314,093 A | * | 5/1994 | Gross et al. ............ 222/153.14 |
| 5,397,060 A | * | 3/1995 | Maas et al. ................. 239/333 |
| 5,405,120 A | | 4/1995 | Kerpan |
| 5,820,050 A | * | 10/1998 | Zollinger .................. 242/152.1 |
| 5,904,302 A | * | 5/1999 | Brown ......................... 239/586 |
| 6,142,194 A | * | 11/2000 | McClaran .................... 141/346 |
| 6,244,107 B1 | * | 6/2001 | Nelson et al. ................. 73/431 |

* cited by examiner

*Primary Examiner*—Max Noori
(74) *Attorney, Agent, or Firm*—Fraser Martin Buchanan Miller LLC; Donald R. Fraser

(57) ABSTRACT

A test gauge for testing an aircraft fueling nozzle for excessive wear in the interlock mechanism including a slotted fixture designed to depress the interlock plate to simulate more advanced wear on the interlock mechanism of the nozzle than is actually present in order to provide an advanced warning of excessive wear.

7 Claims, 1 Drawing Sheet

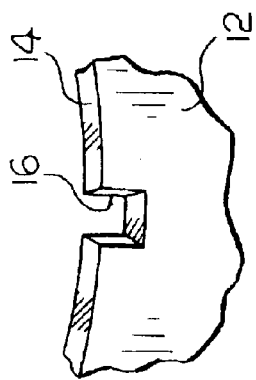
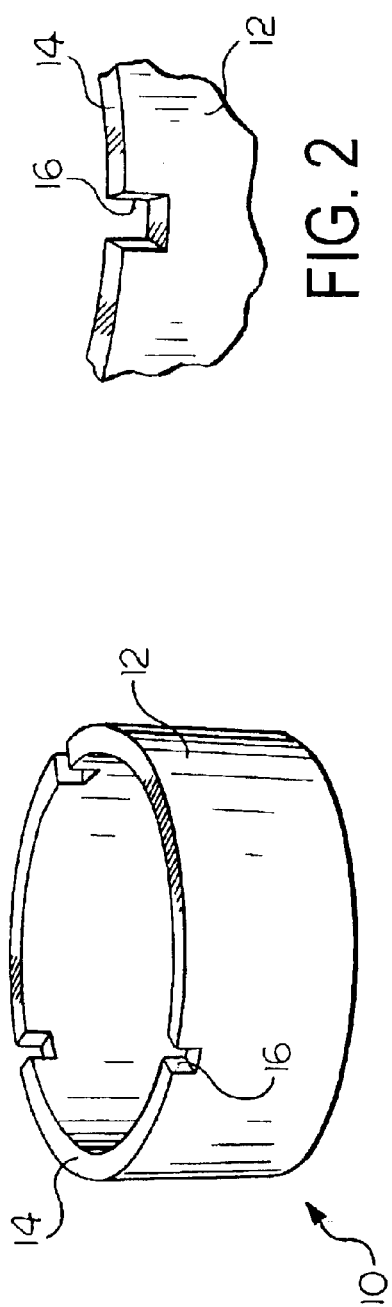
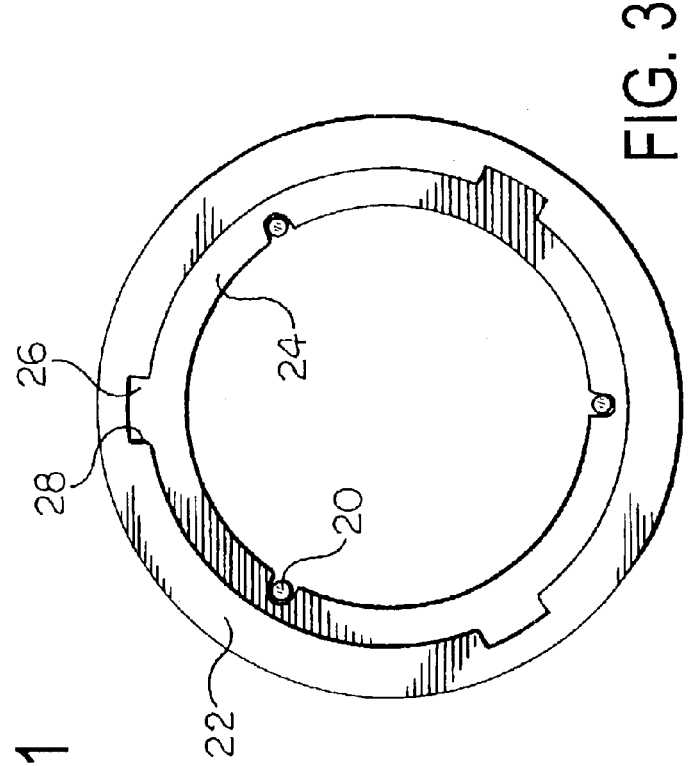

NOZZLE TEST FIXTURE

BACKGROUND OF THE INVENTION

1. Field of the Invention

The present invention relates to a test fixture for a nozzle of an aircraft fueling system and more particularly to a test fixture for sensing excessive wear on aircraft fueling nozzles.

2. Description of the Prior Art

Typical aircraft fueling nozzle structures are provided with a poppet type fluid control valve. The valve is disposed at the outlet end of the fuel source for connection to a fueling flange or adapter on an aircraft and at the inlet end of a connection to a fuel supply hose. The poppet of the valve has a head and a stem which is guided for reciprocal movement in the valve body. The valve is actuated by linkage which includes an arm rotatably connected to the valve stem, a crank connected to the arm and means for actuating the crank, such as a hand operated lever connected to the crank by means of a shaft, for example.

In one typical design, a single crank is used with two arms, one at either side of the crank and valve stem. The arms are connected to the crank by an axle pin and connected to the valve stem by a second axle pin extending through the stem. With the crank disposed adjacent the inlet end of the nozzle body, the arms extend downstream toward the outlet end, where they are connected to an end of the valve stem. The poppet is mounted to the other end of the valve stem.

The valve seat is supported and typically biased toward the poppet head by suitable spring means to normally provide a sealing relation between the poppet and the valve seat. Operation is mechanical through manual control. The poppet type valve seals the nozzle outlet against leakage of fuel when not attached to a mating adapter aboard an aircraft, for example. The control for the valve is locked against operation until after the nozzle has been coupled to the adapter. When the nozzle has been coupled to the associated adapter, the nose-seal of the nozzle is compressed against the sealing surface of a bayonet type flange of the adapter to form a fluid-tight connection between the nozzle and the adapter. When this connection is suitably achieved, the valve flow control handle is unlocked so that subsequent rotation of the handle effectively lifts the poppet valve head from its seat thus opening a passageway for fuel to flow from the nozzle to the aircraft through the adapter.

In a nozzle assembly manufactured by Whittaker Controls, Inc., North Hollywood, Calif. 91605, the nozzle is provided with a connector for mating with a fueling flange of an aircraft. The fueling flange has an annular rim with three radially outwardly projecting lugs and three slots intermediate the lugs. The connector has three ramps interspaced with three slots, which are configured to receive the fueling flange lugs. When the nozzle is mated with the fueling flange, the lugs are adapted to pass through the slots as the flange depresses an associated spring loaded interlock plate. The flange is secured to the nozzle to avoid any relative rotation by pins which are attached to the nozzle body and extend into the slots on the fueling flange. When the interlock plate is depressed, the connector may be rotated so that the lugs are secured beneath the ramps thereby firmly connecting the flange to the nozzle and unlocking the crank arm to permit the opening of the poppet valve to allow for the flow of the pressurized fuel therethrough.

However, after extended use, it has been found that excessive wear occurs allowing the nozzle to be opened when it is not connected to an adapter on an aircraft or a refueling vehicle. Obviously, such leakage and spillage are particularly undesirable and dangerous when the fluid being handled is reactive, flammable, electrically conductive, noxious, toxic, and creates a slippery area adversely effecting transient traffic.

Accordingly, it is an object of the present invention to produce a test fixture enabling the testing of aircraft fueling nozzles for excessive wear.

SUMMARY OF THE INVENTION

The above object may typically be achieved by a test fixture for an interlock plate of a fueling nozzle comprising a main body, the body having an annular rib projecting outwardly therefrom, the rib provided with spaced apart slots, whereby the annular rib may depress an interlock plate an amount equal to the depth of the slots.

BRIEF DESCRIPTION OF THE DRAWINGS

The above object and advantages of the invention will become readily apparent to those skilled in the art from reading the following detailed description of the invention when considered in the light of the accompanying drawings, in which:

FIG. 1 is a perspective view of a test fixture embodying the features of the present invention;

FIG. 2 is an enlarged fragmentary view of one of the slots formed in the fixture illustrated in FIG. 1; and FIG. 3 is a schematic plan view of a typical nozzle of an aircraft fueling system illustrating the sites for use of the present invention.

DETAILED DESCRIPTION OF THE PREFERRED EMBODIMENT OF THE INVENTION

Referring to the drawings, there is illustrated a nozzle test fixture used to test for excessive wear on aircraft fueling nozzles of the type manufactured and sold by Whittaker Controls, Inc., North Hollywood, Calif. 91605 and commercially identified as Pressure Refueling Nozzle F116 Series and F117 Series.

It has been found after considerable use, the refueling nozzle of the type mentioned above may have excessive wear causing a malfunction of the nozzle.

Typically the nozzle body includes a plurality of upstanding pins sized and spaced apart to fit into indexing notches of an adapter which is affixed to an aircraft to be fueled. Three arcuate axially spaced locking ramps are formed on the inner surface of the nozzle. The ramps are interrupted to form spaced apart locking slots adapted to receive locking lugs which are integral with and extend radially outwardly from the adapter.

The outermost locking ramps are typically inclined helically, while the innermost locking ramp on the nozzle is nonhelical.

To connect the nozzle to the aircraft fuel tank, an operator aligns the indexing notches of the adapter with the indexing pins on the nozzle body and positions locking lugs of the adapter within the slots in the nozzle. A counter-clockwise rotation of the nozzle relative to the aircraft adapter causes the locking lugs to advance between the helical locking ramps and the associated lower ramp to sealingly engage and lock the nozzle seal to the aircraft adapter; and simultaneously unlocks the valve flow control handle of the nozzle body, so that subsequent rotation of the handle will effectively lift an associated normally closed poppet valve to an open position, thus providing a passageway for the pressurized fuel to flow into the fuel manifold of the system containing the adapter. The system pressure tends to increase the sealing force between the nozzle and the adapter.

The unlocking of the flow control handle of the nozzle is achieved by the end of the adapter contacting a spring biased interlock plate and causing the same to be moved axially inwardly. In the event excessive wear occurs in the contacting surfaces of the relatively soft metal of the nozzle and the harder metal of the aircraft adapter, the interlock plate is no longer effective to lock the control handle and permit the control handle to be moved to an open position allowing fuel to escape from the nozzle prior to attachment to the aircraft.

It has been found that it would be strongly desirable to avoid the dangerous spills by anticipating the point at which the nozzle becomes ineffective due to excessive wear.

The test fixture, generally indicated by reference numeral 10 may be used to gauge the wear to the critical locations in the nozzle. The fixture 10, clearly illustrated in FIG. 1, consist of a main body portion 12, which is typically a hollow right circular cylinder. At least one end of the main body 12 is provided with an exposed circular flat end 14 having slots 16 formed therein. The slots 16 are equidistantly spaced and are formed to have a width sufficient to receive indexing pins 20 of a fueling nozzle 22 as schematically illustrated in FIG. 3. The preferred configuration of the slots 16 is illustrated in FIG. 2, which illustrates one of the slots 16 illustrated in FIG. 1, but in an enlarged view.

The nozzle 22 contains an axially moveable interlock plate 24. The interlock plate 24 is provided with radially outwardly extending lugs 26 which are guided through axial movement by slots 28 formed in the inner surface of the body of the nozzle 22.

The slots 28 are designed to depress the interlock plate 24 from 0.080" to 0.085".

The test fixture 10 is capable of testing the nozzle interlock mechanism by simulating more wear than is actually present. This is done by moving the interlock plate 24 a small amount from its closed position. The interlock will fail if the nozzle 22 is worn close to, but not beyond its safe limit. This provides a test fixture which will effectively detect a nozzle dangerously near the safe limit for wear.

Wear occurs due to the frictional engagement between the relatively hard metal of the interlock plate 24 and the relatively soft metal of the body of the nozzle 22 by rounding off the sharp corner of the softer nozzle connector. By moving the interlock plate 24 inwardly against the bias of an associated spring between 0.080" to 0.085", the interlock plate 24 will only function properly if the corner of the associated connector is not worn badly. This provides a test which will sense or detect the wear on the nozzle which is dangerously near the safe wear limit.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A test fixture for an interlock plate of a fueling nozzle comprising:
    a main body, said body including a hollow right circular cylindrical portion having an uninterrupted outer surface and terminating in an exposed circular flat end provided with spaced apart slots formed therein, whereby the circular flat end portion can depress an interlock plate of a fuel nozzle an amount equal to the depth of the slots.

2. The invention defined in claim 1 wherein said main body is in the shape of a cylinder.

3. The invention defined in claim 1 wherein said man body is in the shape of a hollow right circular cylinder.

4. The invention defined in claim 2 wherein the slots have a depth of from 0.080 to 0.085 inch.

5. The invention defined in claim 1 wherein the cylindrical portion is a continuation of said body.

6. The invention defined in claim 2 wherein the cylindrical portion is substantially the same outside diameter as the body.

7. A method of testing an aircraft fuel nozzle for excessive wear in an interlock mechanism comprising the steps of:
    depressing the interlock mechanism of the nozzle a predetermined amount in excess of that actually present to detect whether wear has occurred in the nozzle interlock mechanism.

* * * * *